United States Patent [19]
Siegel

[11] 3,951,803
[45] Apr. 20, 1976

[54] MARINE SEWAGE DISPOSAL DEVICE
[76] Inventor: Norman H. Siegel, 2014 Wilson St., Hollywood, Fla. 33020
[22] Filed: Oct. 17, 1974
[21] Appl. No.: 507,745

[52] U.S. Cl. ............................ 210/149; 210/260; 210/313; 219/547
[51] Int. Cl.² ................................ B01D 21/00
[58] Field of Search ............ 210/71, 143, 149, 152, 210/173, 179, 181, 182, 258, 260, 298, 307, 311, 313, 319, 320; 204/149, 152, 302–308; 4/10, 115; 219/547

[56] References Cited
UNITED STATES PATENTS

| | | | |
|---|---|---|---|
| 2,920,763 | 11/1960 | Lind et al. | 210/320 |
| 3,471,020 | 10/1969 | Wallace | 210/179 |
| 3,541,594 | 11/1970 | Wallace | 210/179 |
| 3,546,713 | 12/1970 | Gagne | 210/149 |
| 3,579,651 | 5/1971 | Russo | 4/115 |
| 3,670,891 | 6/1972 | Allen | 210/152 |
| 3,816,073 | 6/1974 | Miller | 204/149 |

*Primary Examiner*—Charles N. Hart
*Assistant Examiner*—Ernest G. Therkorn
*Attorney, Agent, or Firm*—Charles E. Temko

[57] ABSTRACT

A marine sewage disposal device connectable to a toilet and flushed by water, in which the sewage is macerated to small particle size, subjected to heat and electric current to destroy coliform bacteria, and subsequently filtered to separate liquids from solids prior to being discharged. Power requirements are relatively low, in the order of 2 to 5 amperes at 110 volts A.C., or less, thereby permitting the device to be used on relatively small craft having minimal generating equipment, such as a standard generator arranged to bypass the usual voltage regulator.

3 Claims, 2 Drawing Figures

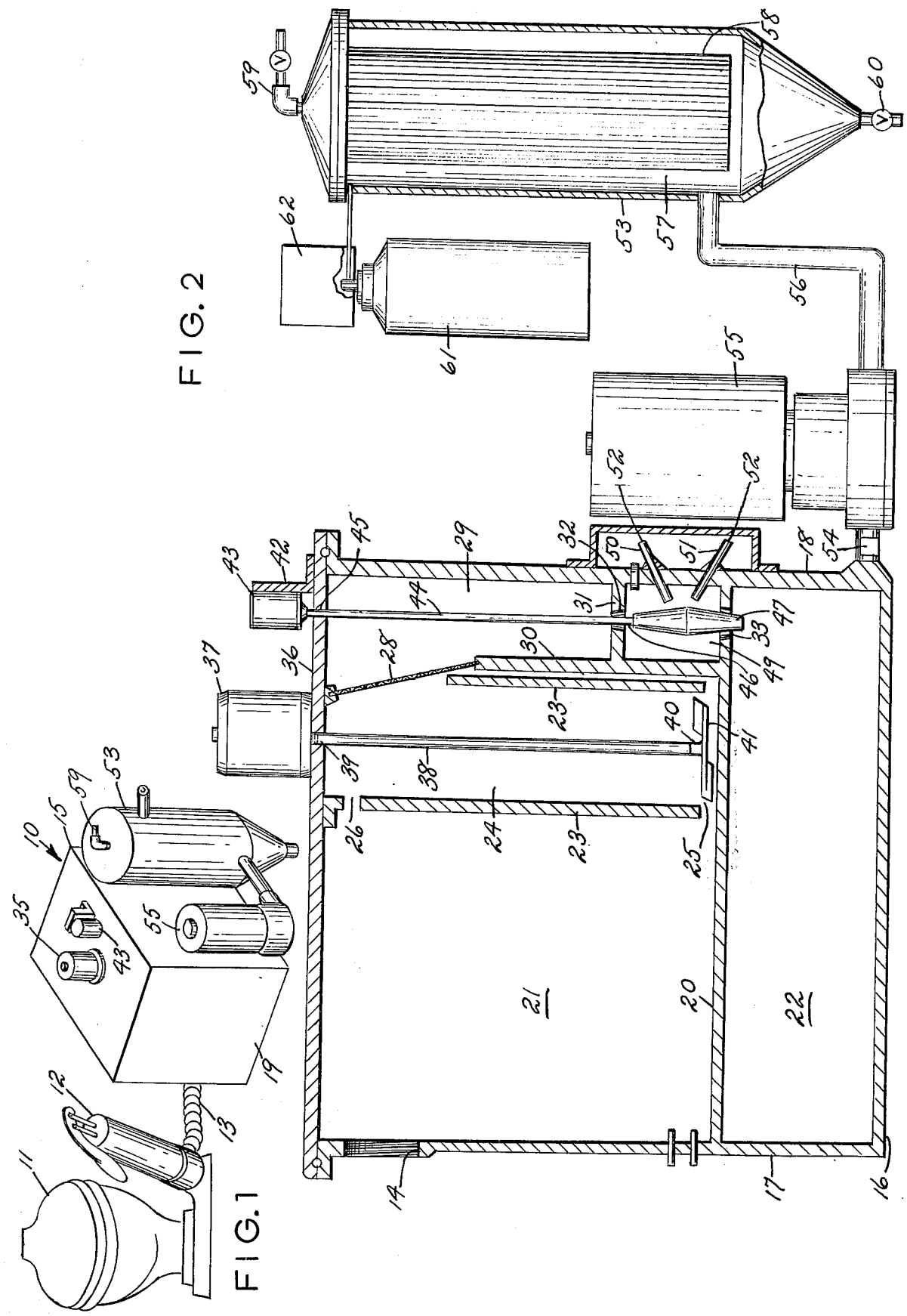

MARINE SEWAGE DISPOSAL DEVICE

BACKGROUND OF THE INVENTION

During the last several years, much legislation has been promulgated in over 38 states with reference to the dumping of raw sewage from boats in rivers, waterways and navigable areas. It has been estimated that a very short period of time remains before a federal law is passed whereby all states will have a requirement.

It is known to treat sewage by electrolysis, and more recent developments have included the use of chemicals which aid in the killing of coliform bacteria. The treatment of large masses of sewage by electrolysis requires substantial amounts of power which are not often available from the generating equipment of relatively small craft, and the use of strong chemical compositions as an aid to decomposition constitutes a pollutant in itself, the discharge of which into navigable water being highly undesirable. It is also known to use a holding tank which creates pathogenic bacteria, whereby the waste is pumped out at a marina or other central collection place. Another process operates on the principal of the microwave oven, whereby the discharge passes through a coil form and is sterilized by microwave induced heating. Such devices present a hazard to the occupants of the craft, and the cost of manufacture is considerable. Another known device uses hypochlorous acid as an electrolyte.

SUMMARY OF THE INVENTION

Briefly stated, the invention contemplates the provision of a miniature sewage treatment facility suitable for installation in boats, trailers, motor homes, and even as a replacement for septic tanks. It operates on the principal of killing the coliform bacteria by sterilization by heat as well as electrocution. The discharge from the toilet is pumped through a macerator into a tank, and subsequently through an electrocution-heating compartment, where several electrodes are positioned. The waste material acts as an electrolyte, particularly well, where flushing has included the use of sea water, or fresh water having a degree of ionization. The waste is metered through the electrocution-heating compartment by means of a thermostatically controlled valve, and after the bacteria has been killed, the effluent is transfered into a tank from where it is subsequently pumped into a filter system where the solids are removed and held until the filter is replaced at a later date when it reaches its holding capacity. The liquid phase, now being sterile, and meeting turbidity standards may be discharged into the waterway, or held in a separate tank, or recirculated.

BRIEF DESCRIPTION OF THE DRAWINGS

In the drawings, to which reference will be made in the specification, similar reference characters have been employed to designate corresponding parts throughout the several views.

FIG. 1 is a view in perspective of an embodiment of the invention.

FIG. 2 is an enlarged schematic view thereof, partly in section.

DETAILED DESCRIPTION OF THE DISCLOSED EMBODIMENT

In accordance with the invention, the device, generally indicated by reference character 10, is illustrated in FIG. 1 in connected relation with an existing marine head 11 normally equipped with either a hand or an electric pump 12. A conduit 13 receives sewage from the pump, and conveys it through a threaded fitting 14 in a main housing 15.

The housing 15 includes a bottom wall 16, side walls 17 and 18, and end walls, one of which is indicated by reference character 19. A horizontally disposed septum 20 divides the housing 15 into an untreated sewage chamber 21 and a treated sewage chamber 22. A tubular septum 23 forms a vertical column 24 having a lower entry opening 25, an upper overflow opening 26 and a screened opening 28, and communicating with pretreatment chamber 29 formed by a vertical septum 30 and a horizontal septum 31. The septum 31 has an opening 32 aligned with an opening 33 in the horizontal septum 20.

A macerator element 35 is supported on an outer surface of a removable cover member 36. It includes an electric motor 37 the armature of which powers a shaft 38 which projects downwardly through an opening 39 in the cover member 36. The lower end 40 of the shaft 38 mounts a bladed impeller 41. Mounted on the upper surface of the cover member 36 is a bracket 42, in turn supporting a linear solenoid 43, the armature shaft 44 of which penetrates an opening 45 in the cover member 36. The lower end 46 thereof mounts a conically-shaped double valve member 47 which alternately seals the openings 32 and 33 depending upon the position of the shaft 44.

The vertical septum 30, and the horizontal septums 20 and 31 define a treatment chamber or compartment 49 penetrated by several pairs of electrodes 50 and 51, the exposed ends 52 of which are connected to a power source (not shown) preferably in the from of a 110 volt A.C. generator or modified alternator capable of approximately 5 amperes maximum output. It is noted that no switch means is necessary to interconnect the generating means with the electrodes 50–51, since the circuit will be open in the absence of sewage in the treatment chamber 49.

The treated sewage chamber 22 receives incremental discharged from the treatment chamber 49, which may be allowed to accumulate for periodic discharge to a filter 53. A conduit 54 interconnects with a pump 55 which may be manually activated, the pipe discharging through a conduit 56 to the filter housing 57 which contains a replaceable cartridge 58 of a type used to collect solid particles on the surfaces thereof. An upper drain 59 permits discharge of treated liquid waste, and a lower discharge 60 permits periodic collection of the solids which will normally be in a slurry form. Discharge of solids may be either at a marina, or in a suitable plastic bag or can, since with the killing of coliform bacteria, such discharge is harmless.

The device may be made of a size such that the untreated sewage chamber 21 may be substantially filled with a single flushing operation of the head 11. When there is any substantial amount of untreated sewage in the chamber 21, its presence is sensed by level probes 64–65 which commence and interrupt operation of the macerator element 35. The macerator element continues to run until it substantially empites the chamber 21. In the event the chamber 29 is filled, overflow merely returns to the chamber 21 through the opening 26. The valve member 47 will normally be in its lowermost position as shown in FIG. 2, permitting the entry from the pretreatment chamber 29 of untreated sewage to the treatment chamber 49. When it is filled sufficient to cover the exposed ends of the electrodes 50–51, the sewage itself forms an electrolyte, and heat is induced in the same by the passage of current between the electrodes. When the temperature of the treatment chamber 49 reaches approximately 160° to 180°, the coliform bacteria has been killed, and the thermostat 48 operates the solenoid 43, closing the pretreatment chamber 29, and permitting treated sewage to flow into the chamber 22. The removal of the treated sewage will open the circuit between the electrodes 50–51, causing the treatment chamber 49 to cool to a degree sufficient to again actuate the thermostat 48, resulting in operation of the solenoid 43 to close the chamber 22, and open the chamber 29, to permit more untreated sewage to flow into the chamber 49. The cycle is again repeated so long as there is untreated sewage remaining in the pretreatment chamber 29.

As optional equipment, a deodorizing means in the form of an aerosol can 61 operated by a timer 62 may be provided, the output of which communicates with the interior of the filter housing 57.

Normal cycle time is approximately three minutes, at which time complete destruction of coliform bacteria can be accomplished.

I wish it to be understood that I do not consider the invention limited to the precise details of structure shown and set forth in this specification, for obvious modifications will occur to those skilled in the art to which the invention pertains.

I claim:

1. A sewage disposal device adapted to receive the discharge of a toilet or head, and incorporating means for killing coliform bacteria present in such sewage comprising: storage tank means having an inlet from said toilet for receiving untreated sewage, septum means within said tank means defining a vertically oriented enclosure, said septum means having upper and lower openings therein communicating with the interior of said storage tank means for the recycling of non-particulated sewage; macerator means disposed within said vertically oriented enclosure having an impeller at a lower end thereof, said enclosure having filtering screen means disposed at an upper end thereof forming an outlet passing particulated sewage impelled by said macerator; pre-treatment storage means having an inlet bordering said screen receiving particulated sewage past thereby, a sewage treatment compartment disposed beneath said pre-storage means, first valving means forming an outlet at a lower end of said pre-treatment storage means and an inlet to said sewage treatment compartment, permitting the passage of particulate sewage under gravity from the former to the latter; heating means including a pair of electrodes disposed within said treatment compartment automatically operative upon the presence of sufficient particulate sewage forming an ionizable fluid in said treatment compartment; second valving means disposed at the bottom of treatment compartment forming an outlet for draining the same of treated waste, and thermostatic means for sensing the attainment of a pre-determined temperature in said treatment compartment determining the completion of a treatment heating cycle and controlling operation of said first and second valving means.

2. Structure in accordance with claim 1, in which said first and second valves are operated by a common electrical solenoid.

3. Structure in accordance with claim 1, including filtering means and pump means receiving treated sewage from said treatment compartment for separating the liquid and solid phases thereof.

* * * * *